(12) United States Patent
Kurashige et al.

(10) Patent No.: US 7,297,954 B2
(45) Date of Patent: Nov. 20, 2007

(54) INORGANIC SCINTILLATOR, AND RADIATION DETECTOR AND PET APPARATUS EMPLOYING IT

(75) Inventors: Kazuhisa Kurashige, Hitachinaka (JP); Hiroyuki Ishibashi, Hitachinaka (JP); Tatsuya Usui, Hitachinaka (JP); Shigenori Shimizu, Tsukuba (JP); Naoaki Shimura, Hitachinaka (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 11/437,703

(22) Filed: May 22, 2006

(65) Prior Publication Data
US 2006/0266945 A1 Nov. 30, 2006

(30) Foreign Application Priority Data
May 24, 2005 (JP) ............ P2005-150991
May 11, 2006 (JP) ............ P2006-132879

(51) Int. Cl.
*G01T 1/20* (2006.01)
(52) U.S. Cl. .............. 250/361 R; 250/370.12
(58) Field of Classification Search ............ 250/370.12
See application file for complete search history.

(56) References Cited

U.S. PATENT DOCUMENTS

| | | | |
|---|---|---|---|
| 6,278,832 B1* | 8/2001 | Zagumennyi et al. | 385/141 |
| 6,967,330 B1* | 11/2005 | Lempicki et al. | 250/361 R |
| 6,979,499 B2* | 12/2005 | Walck et al. | 428/690 |
| 2005/0012044 A1* | 1/2005 | Tadokoro et al. | 250/363.01 |
| 2006/0054831 A1* | 3/2006 | Shimizu et al. | 250/370.11 |

FOREIGN PATENT DOCUMENTS

| | | |
|---|---|---|
| JP | 04-218588 | 8/1992 |
| JP | 2001-004753 | 1/2001 |

* cited by examiner

*Primary Examiner*—David Porta
*Assistant Examiner*—David S Baker
(74) *Attorney, Agent, or Firm*—Antonelli, Terry, Stout & Kraus, LLP.

(57) ABSTRACT

The inorganic scintillator of the invention has the chemical composition represented by $Ce_xLn_ySi_zO_u$ (where Ln represents at least two elements selected from among Y, Gd and Lu. $0.001 \leq x \leq 0.1$, $1.9 \leq y \leq 2.1$, $0.9 \leq z \leq 1.1$, $4.9 \leq u \leq 5.1$) and emits fluorescence upon incidence of radiation, wherein the maximum peak wavelength in the intensity spectrum of the emitted fluorescence is a peak in the range between 450 nm and 600 nm.

14 Claims, 3 Drawing Sheets

INORGANIC SCINTILLATOR, AND RADIATION DETECTOR AND PET APPARATUS EMPLOYING IT

BACKGROUND OF THE INVENTION

1. Field of the Invention

The present invention relates to an inorganic scintillator, and to a radiation detector and PET apparatus employing it.

2. Related Background Art

In Positron Emission computed Tomography (hereinafter, PET) apparatuses, the optical characteristics (wavelength conversion properties, etc.) of the scintillators mounted therein have a major influence on the overall apparatus imaging performance. Thus, improvement in the optical characteristics of the scintillator component is one of the most import aspects for enhancing overall apparatus imaging performance. Researchers are therefore actively exploring scintillator materials which can be used to construct scintillators with excellent optical characteristics, and are developing manufacturing techniques such as crystal growth techniques for realizing such scintillators.

PET examination can provide highly detailed information for cancer detection, and its clinical application for cancer is becoming more common. Clinical applications for cancer include, for example, diagnosis of tumor malignancy before treatment, clinical stage diagnosis based on detection of cancer infiltration extent and identification of metastatic lesions, judgment and evaluation of response to cancer therapy either during or immediately after treatment, and prognosis or diagnosis of recurrence after treatment. However, when the goal is to perform accurate diagnosis of the extent of tumor infiltration, PET images alone do not provide accurate positional data for biological organs or tissue.

On the other hand, X-ray CT or MRI apparatuses allow accurate visualization of detailed anatomical information from the body, and are widely used in the field of medicine. However, such apparatuses are not capable of analysis of metabolic function as is possible with PET. New cancer diagnosis methods have therefore been desired which take advantage of the excellent features of both PET apparatuses and X-ray CT or MRI apparatuses while compensating for their drawbacks.

In recent years, PET-CT apparatuses have been developed that simultaneously collect metabolic function information by PET imaging and anatomical position information by X-ray CT imaging, to permit diagnosis based on combination of both images. PET-MRI apparatuses are also being investigated, for simultaneous collection of metabolic function information by PET imaging and anatomical position information by MRI imaging, to permit diagnosis based on combination of both images.

However, because MRI requires a powerful magnetic field, the photoelectric multipliers employed in conventional PET apparatuses cannot be used. Specifically, a photoelectric multiplier converts fluorescent light emitted upon radiation incident onto the scintillator into an electrical signal, but for reasons of construction the photoelectric multiplier cannot be used in the presence of a powerful magnetic field. Photodiodes, on the other hand, are elements capable of converting fluorescence emitted from a scintillator into an electrical signal without being affected by magnetic fields.

In a radiation detector combining a photoelectric multiplier and a scintillator, the fluorescent wavelength with the highest conversion efficiency by the photoelectric multiplier to electrical signals is about 415 nm. Thus, radiation detectors employ scintillators having a light intensity spectrum peak wavelength of about 415 nm (for example, Japanese Examined Patent Application Publication HEI No. 7-78215). However, the wavelength region of high conversion efficiency for a photodiode is 450-600 nm. Consequently, a scintillator used to construct a radiation detector in combination with a photodiode preferably is one having a light intensity peak wavelength in the wavelength range of high conversion efficiency by the photodiode.

Japanese Patent Publication Laid-open No. 2001-4753 discloses a scintillator having a light intensity peak wavelength in the range of 450-600 nm, which is the region of high photodiode conversion efficiency. The scintillator described in Japanese Patent Publication Laid-open No. 2001-4753 is an oxide fluorescent material having a garnet crystal structure, with oxides composed of at least the elements Gd, Ce, Al, Ga and O.

SUMMARY OF THE INVENTION

The scintillators mounted in PET apparatuses must exhibit high light output and a short decay time, as essential optical characteristics. In particular, scintillators with short decay times are desired from the viewpoint of shortening examination times and relieving the burden on patients being examined by PET, as well as from the viewpoint of preventing "pile-up" of multiple fluorescent pulses to obtain a radiation detector with high time resolution. However, the oxide fluorescent material described in Japanese Patent Publication Laid-open No. 2001-4753 has a long decay time and is therefore in need of improvement for mounting in a PET apparatus.

It is therefore an object of the present invention, which has been accomplished in light of the circumstances described above, to provide an inorganic scintillator having a high light output and a light intensity peak wavelength in the wavelength range of 450-600 nm, which is the region of high photodiode conversion efficiency, as well as a radiation detector and PET apparatus employing the inorganic scintillator.

The inorganic scintillator of the invention is an inorganic scintillator having the chemical composition represented by the following formula (1) and inequalities (2) to (5) below and emitting fluorescence upon incidence of radiation, while its maximum peak wavelength in the intensity spectrum of the emitted fluorescence is a peak in the range between 450 nm and 600 nm.

$$Ce_xLn_ySi_zO_u \quad (1)$$

$$0.001 \leq x \leq 0.1 \quad (2)$$

$$1.9 \leq y \leq 2.1 \quad (3)$$

$$0.9 \leq z \leq 1.1 \quad (4)$$

$$4.9 \leq u \leq 5.1 \quad (5)$$

Ln in formula (1) represents at least two elements selected from among Y, Gd and Lu.

Using an organic scintillator of the invention having a chemical composition satisfying all of conditions (1) to (5) above, it is possible to yield a peak wavelength in the range between 450 nm and 600 nm for the intensity spectrum of fluorescence emitted upon incidence of radiation. Thus, fluorescence will be converted to an electrical signal by the photodiode with high conversion efficiency. The reason for the high conversion efficiency is that the wavelength region of high conversion efficiency of the photodiode (450-600 nm) matches the region of the peak wavelength of fluorescence emitted from the inorganic scintillator.

The peak wavelength of the light intensity spectrum of the inorganic scintillator of the invention is preferably between 500 nm and 550 nm. This is because a photodiode has particularly high conversion efficiency for fluorescence of wavelengths between 500-550 nm.

Also, the fluorescence of the inorganic scintillator of the invention is preferably due principally to oxygen-hexacoordinated cerium atoms, and is preferably a crystal belonging to monoclinic crystals of the space group C2/c.

The scintillator of the invention is also preferably in a single crystal form. A single crystal form will allow the superior scintillator properties to be more reliably exhibited.

For an inorganic scintillator according to the invention, the x in formula (1) preferably satisfies the condition represented by the following inequality (6).

$$0.02 \leq x \leq 0.1 \quad (6)$$

A value of x, representing the Ce content, that satisfies the above inequality (6) will increase the number of oxygen-hexacoordinated Ce atoms. This can result in a longer peak wavelength for the intensity spectrum of fluorescence outputted upon incidence of radiation. The peak wavelength can therefore be more reliably adjusted to the range of 450 nm to 600 nm.

The Ln elements in formula (1) for the inorganic scintillator of the invention may be Gd and Lu. A larger-ion radius for Ln occupying the oxygen-hexacoordinated positions in the crystal structure will facilitate substitution of Ce for the oxygen-hexacoordinated Ln. Therefore, the two or more Ln elements selected from among Y, Gd and Lu preferably include many elements with large ion radii. That is, the molar fraction value for Gd is preferably equal to or greater than the molar fraction value for Lu. The sizes of the (hexacoordinated) ion radii of Y, Gd and Lu are in the order Gd>Y>Lu.

The Ln elements in formula (1) for the inorganic scintillator of the invention may alternatively be Y and Lu. In this case, the molar fraction value for Y is preferably equal to or greater than the molar fraction value for Lu, for the same reason explained above.

The Ln elements in formula (1) for the inorganic scintillator of the invention may also be Y, Gd and Lu. In this case, the total of the molar fraction values for Y and Gd is preferably equal to or greater than the molar fraction value for Lu, for the same reason explained above.

When Gd is used as one of the elements represented by Ln in formula (1), a peak wavelength in the range of between 450 nm and 600 nm can be guaranteed by adding Gd so that the molar ratio of Gd is less than 90 mole percent based on the total moles of Ln, in addition to satisfying the aforementioned conditions relating to the molar ratios of Ln elements. This will permit a scintillator crystal structure belonging to the space group C2/c to be obtained, in order to ensure an adequate number of oxygen-hexacoordinated Ce atoms.

The radiation detector of the invention comprises a combination of the aforementioned inorganic scintillator of the invention and a photodiode. In the radiation detector of the invention, the intensity spectrum wavelength of fluorescence emitted from the inorganic scintillator of the invention is between 450 nm and 600 nm, and therefore the fluorescence is converted to an electrical signal by the photodiode with high conversion efficiency. The radiation is therefore detected at high precision. Moreover, since a photodiode is used as the element for conversion of the fluorescence emitted from the inorganic scintillator into an electrical signal, the radiation detector of the invention may be used even in the presence of a powerful magnetic field.

A PET apparatus of the invention is provided with the radiation detector of the invention described above. In the PET apparatus of the invention, the intensity spectrum wavelength of fluorescence emitted from the inorganic scintillator of the invention is between 450 nm and 600 nm. Thus, fluorescence will be converted to an electrical signal by the photodiode with high conversion efficiency. Radiation is therefore detected at high precision. Moreover, a photodiode is used as the element for conversion of the fluorescence emitted from the inorganic scintillator into an electrical signal. Since a photodiode can be used even in the presence of a powerful magnetic field, an MRI apparatus may be combined with a PET apparatus according to the invention to construct a PET-MRI apparatus. Thus, it is possible to accomplish simultaneous collection of metabolic function information by PET imaging and anatomical position information by MRI imaging, to permit diagnosis based on combination of both images.

According to the invention, it is possible to provide an inorganic scintillator having a high light output and a light intensity peak wavelength in the wavelength range of 450-600 nm, which is the region of high photodiode conversion efficiency, as well as a radiation detector and PET apparatus employing the inorganic scintillator.

DESCRIPTION OF THE PREFERRED EMBODIMENTS

Figure 1:
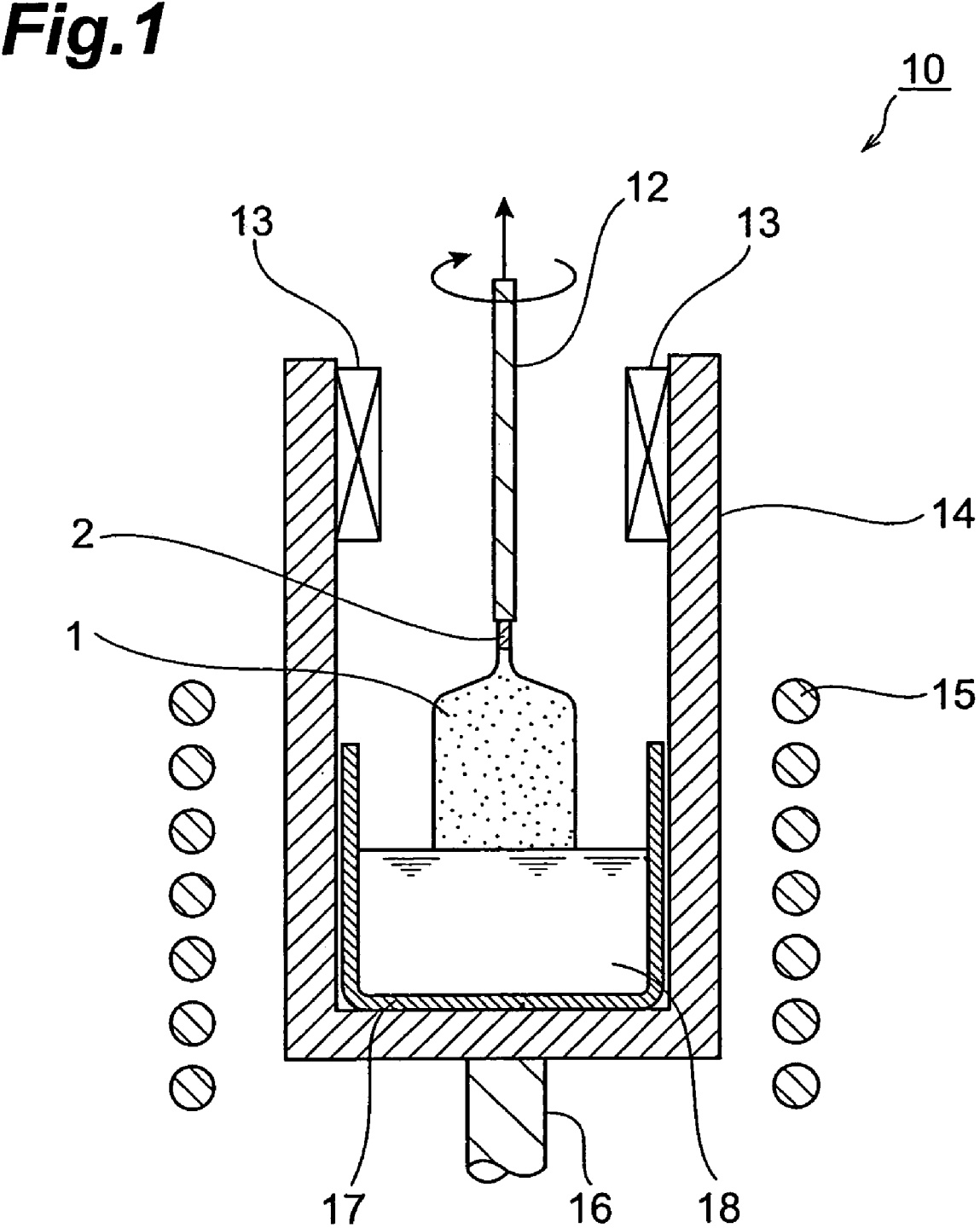
FIG. 1 is a schematic cross-sectional view showing an example of the basic construction of an apparatus for fabrication of an inorganic scintillator of the invention.

Preferred embodiments of the invention will now be explained in detail, with reference to the accompanying drawings as necessary. Throughout the drawings, corresponding elements will be referred to by like reference numerals and will be explained only once. Unless otherwise specified, the vertical and horizontal positional relationships are based on the positional relationships in the drawings. The dimensional proportions in the drawings are not restricted to the proportions shown.

An inorganic scintillator according to a preferred embodiment of the invention is an inorganic scintillator that has the chemical composition represented by formula (1) and inequalities (2) to (5) below, emits fluorescence upon incidence of radiation, and has a light intensity spectrum with a maximum peak wavelength in the range between 450 nm and 600 nm.

$$Ce_xLn_ySi_zO_u \quad (1)$$

$$0.001 \leq x \leq 0.1 \quad (2)$$

$$1.9 \leq y \leq 2.1 \quad (3)$$

$$0.9 \leq z \leq 1.1 \quad (4)$$

$$4.9 \leq u \leq 5.1 \quad (5)$$

Ln in formula (1) represents at least two elements selected from among Y, Gd and Lu.

The present inventors have discovered that GSO($Ce_x Gd_{2-x}SiO_5$), which is an inorganic scintillator having Ce substituting essentially only oxygen-heptacoordinated Ln, has a short light intensity spectrum peak wavelength of about 415 nm. Also, it was found that if Ce is substituted for oxygen-hexacoordinated Ln by a method such as, for example, adding excess Ce to a crystal structure belonging to monoclinic crystals of the space group C2/c, fluorescence with an intensity spectrum peak wavelength of 450 nm or longer is emitted from the oxygen-hexacoordinated Ce. On this basis we completed the inorganic scintillator of the invention, having a light intensity spectrum peak wavelength of between 450 nm and 600 nm. In this case, oxygen-heptacoordinated Ce is also present. However, the output from oxygen-heptacoordinated Ce upon incidence of radiation does not contribute to luminescence because it is of higher energy than the output from oxygen-hexacoordinated Ce, its energy instead being transferred to Ce located at the oxygen-hexacoordinated positions, thereby contributing to oxygen-hexacoordinated Ce luminescence.

Thus, an inorganic scintillator of the invention emits fluorescence with an intensity spectrum peak wavelength of between 450 nm and 600 nm upon incidence of radiation. The fluorescence in this wavelength range is converted by a photodiode to an electrical signal with high conversion efficiency.

A scintillator mounted in a PET apparatus must exhibit high light output and a short decay time as essential optical characteristics, in addition to emitting fluorescence with a peak in the aforementioned specific wavelength range. In particular, when an inorganic scintillator is used in the detector of a PET apparatus, a shorter decay time for fluorescence outputted from the inorganic scintillator is preferred because this will improve the energy time resolution.

If the scintillator has a long decay time, fluorescence corresponding to incidence of new radiation to the scintillator will be outputted before disappearance of the previous fluorescence outputted upon incidence of radiation. When this occurs, the two radiation beams will no longer be separately detectable. In other words, the time resolution will be reduced. This phenomenon is known as "pile-up". Such pile-up can be prevented by cutting the residual component outputted from the scintillator or the delayed output fluorescent component (second fluorescent component) in the electronic circuitry mounted in the detector of the PET apparatus. However, cutting of fluorescent components in the electronic circuitry can result in reduced detection efficiency.

According to the scintillator of the invention, the decay time of fluorescence emitted from the scintillator can be adequately shortened. While the main reason the decay time can be adequately shortened is not yet fully understood, the present inventors conjecture that it is due to the use of Ce which generally has a short decay time of emitted fluorescence, and is based on the crystal structure of the scintillator. The scintillator of the invention allows the decay time to be shortened to about 70 ns and is thus able to prevent pile-up while also enhancing the time resolution. In contrast, the decay time is often prolonged depending on the crystal structure even if Ce is the fluorescence-emitting element, as in the scintillator having a garnet crystal structure described in Japanese Patent Publication Laid-open No. 2001-4753. In the scintillator having a garnet structure described in Japanese Patent Publication Laid-open No. 2001-4753, the decay time is approximately 3 µs and the persistence is about 30 ms, and therefore improvement is necessary before it can be used as a scintillator for PET.

Throughout the present specification, "radiation" refers to particle rays (α rays, β rays, γ rays, X-rays, etc.) having sufficient energy to ionize atoms or molecules.

A preferred mode of a process for fabrication of an inorganic scintillator according to the invention (an example of a fabrication process for obtaining a rare earth silicate single crystal as a single crystal of a metal oxide) will now be explained.

The fabrication process for an inorganic scintillator of this mode is a fabrication process for an inorganic scintillator which is a rare earth silicate single crystal containing Ce, Ln and Si. Ln represents at least two elements selected from among Y, Gd and Lu. The fabrication process explained here comprises a melting step in which the raw material for the inorganic scintillator is brought to a molten state by a melting method to obtain a melt, a cooling and solidification step in which at least a portion of a seed crystal is dipped in the melt and the melt in which the seed crystal has been dipped is cooled to solidification to grow the crystal along a prescribed crystal plane of the seed crystal and obtain a single crystal ingot, and a cutting step in which the single crystal ingot is cut out to a prescribed shape and size.

From the standpoint of more reliably obtaining an inorganic scintillator according to this mode, the melting method in the melting step is preferably a Czochralski process. In this case, a lifting apparatus 10 having the construction shown in FIG. 1 is preferably used for the operation in the melting step and cooling and solidification step.

FIG. 1 is a schematic cross-sectional view showing an example of the basic construction of an apparatus for fabrication of an inorganic scintillator according to this mode.

The lifting apparatus 10 shown in FIG. 1 has a high-frequency induction heating furnace (two-zone hot growth furnace) 14. The high-frequency induction heating furnace 14 is used for continuous operation in the melting step and the cooling and solidification step described above.

The high-frequency induction heating furnace 14 is a refractory closed-bottom container with a cylindrical wall. The shape of the closed-bottom container is the same as one used for single crystal growth based on the publicly known Czochralski process. A high-frequency induction coil 15 is wound on the outside of the bottom of the high-frequency induction heating furnace 14. Also, a crucible 17 (for example, a crucible made of Ir (iridium)) is set on the bottom inside the high-frequency induction heating furnace 14. The crucible 17 also serves as a high-frequency induction heater. The starting material for the inorganic scintillator is loaded into the crucible 17, and application of high-frequency induction to the high-frequency induction coil 15 heats the crucible 17 and produces a melt 18 composed of the constituent material of the inorganic scintillator.

A heater 13 (resistance heater) is also set at the top inner wall without contacting the melt 18 in the high-frequency induction heating furnace 14. This heater allows independent control of the heating output with respect to the high-frequency induction coil 15.

At the center bottom of the high-frequency induction heating furnace 14 there is provided an opening (not shown) which passes from the inside to the outside of the high-frequency induction heating furnace 14. Through this opening there is inserted a crucible support rod 16, from the outside of the high-frequency induction heating furnace 14. The tip of the crucible support rod 16 is connected to the bottom of the crucible 17. Rotating the crucible support rod 16 allows the crucible 17 to be rotated in the high-frequency induction heating furnace 14. The area between the opening and the crucible support rod 16 is sealed with packing or the like.

A more specific fabrication method using a lifting apparatus 10 will now be explained.

First in the melting step, the starting material for the single crystal of the inorganic scintillator is loaded into the crucible 17, and application of high-frequency induction to the high-frequency induction coil 15 produces a melt 18 composed of the constituent material of the inorganic scintillator. The starting material for the single crystal may be, for example, a simple oxide of a rare earth metal and Si which is to compose the single crystal.

Next, in the cooling and solidification step, the melt is cooled to solidity to obtain a single crystal ingot 1 for the cylindrical inorganic scintillator. More specifically, the operation proceeds through two separate steps, the growth step described below and a cooling step.

First, in the growth step, a lifting rod 12 having the seed crystal 2 anchored to the lower end is dipped into the melt 18 from the top of the high-frequency induction heating furnace 14. Next, the lifting rod 12 is raised while forming the inorganic scintillator single crystal ingot 1. During this time, the heating output from the heater 13 is adjusted in the growth step, so that the inorganic scintillator single crystal ingot 1 raised from the melt 18 grows to have a cross-section with the prescribed diameter.

From the viewpoint of more reliably obtaining a single crystal belonging to the space group C2/c, the seed crystal serving as the nucleus of the single crystal ingot 1 is preferably a single crystal belonging to the space group C2/c. Specifically, the single crystal is more preferably a rare earth silicate single crystal, and more preferably one comprising Lu, Gd or Y as the rare earth element. Thus, it may include a rare earth silicate containing Lu and Gd, a rare earth silicate containing Y, a rare earth silicate containing Lu but containing essentially no Gd (i.e., containing Gd only as an avoidable impurity), or the like. Among such materials, using a single crystal composed of a rare earth silicate containing Lu and Gd as the seed crystal will allow the inorganic scintillator to be fabricated in a more reliable manner.

Next, in the cooling step, the heating output of the heater is adjusted for cooling of the grown single crystal ingot (not shown) obtained after the growth step.

The gas phase in the high-frequency induction heating furnace 14 during the operation of the melting step and cooling and solidification step is preferably composed of a mixed gas whose major component is an inert gas satisfying the condition represented by the following inequality (7). This will adequately prevent cracking of the single crystal for more reliable production of a single crystal for the inorganic scintillator.

$$100 \times \{G/(E+G)\} \leq 2.0 (\%) \quad (7)$$

In inequality (7), E represents the partial pressure of the inert gas in the mixed gas, and G represents the partial pressure of the oxygen gas in the mixed gas. According to the invention, "inert gas" means a rare gas or nitrogen gas.

If the value of $\{G/(E+G)\}$ exceeds 2.0%, more coloration will tend to be produced in the crystal, lowering the scintillator performance. If the value of $\{G/(E+G)\}$ exceeds 4.0%, and Ir is used as the constituent material of the crucible, vaporization of the structural material will proceed vigorously, hampering growth of the crystal.

Next, in the cutting step, the single crystal ingot 1 of the inorganic scintillator is cut to the prescribed shape and size to obtain an inorganic scintillator single crystal.

The above detailed explanation of a preferred mode of the invention is not intended to restrict the scope of the invention to this particular mode. For example, the inorganic scintillator of the invention may be polycrystalline in its solid state. If the inorganic scintillator of the invention is polycrystalline, it may be obtained by a sol-gel production process in the same manner as conventional polycrystalline scintillators.

EXAMPLES

The present invention will now be explained in greater detail through the following examples, with the understanding that these examples are in no way limitative on the invention.

Example 1

In an Ir crucible having the same shape shown in FIG. 1 with a diameter of 110 mm, a height of 100 mm and a thickness of 2.5 mm there were loaded 3600.64 g of gadolinium oxide ($Gd_2O_3$, 99.99 wt % purity), 1000.64 g of lutetium oxide ($Lu_2O_3$, 99.99 wt % purity), 755.44 g of silicon dioxide ($SiO_2$, 99.99 wt % purity) and 43.28 g of cerium oxide ($CeO_2$, 99.99 wt % purity) as the starting materials, and 5400.00 g of the mixture was obtained. The crucible was then placed at a prescribed position of a high-frequency induction heating furnace and the mixture was heated to melting at 1950° C. or higher to obtain a melt (chemical composition of melt: $Ce_{0.02}Lu_{0.4}Gd_{1.58}SiO_5$).

Next, the end of the lifting rod to which the seed crystal was anchored was placed in the melt for crystal growth. The seed crystal used was a cut-out single crystal composed of a metal oxide containing Lu, Gd, Ce and Si, obtained by an ordinary crystal growth method. The crystal structure of the seed crystal was confirmed to be a monoclinic crystal belonging to the space group C2/c using a powder X-ray diffraction apparatus (RAD™, product of Rigaku Corp.).

Next, a single crystal ingot with a neck diameter of 8 mmϕ was lifted at a lifting speed of 3-10 mm/h to form a neck section. The cone section (cylinder trunk) was then lifted, initiating lifting of the cylinder trunk when the diameter reached 25 mmϕ (growth step). The atmosphere in the furnace was adjusted to an oxygen concentration of 0.5 vol % by modifying the flow rates of nitrogen and oxygen into the furnace.

The cylinder trunk was grown, and then the single crystal ingot was cut off from the melt. The atmosphere in the furnace was then adjusted to an atmosphere with a low oxygen partial pressure than during single crystal growth (virtually oxygen-free), and the furnace temperature was set to 1900° C. The single crystal ingot was subjected to heat treatment for 24 hours while maintaining the furnace temperature constant at about 1900° C. (heating step).

The single crystal ingot was then cooled while lowering the temperature in the furnace at a rate of 50° C./hr with the atmosphere in the furnace being kept in the same state as during heating (cooling step). After cooling was complete, the obtained single crystal was taken out. The obtained single crystal ingot had a crystal mass of about 2495 g.

Next, part of the bottom of the obtained single crystal was cut out and worked into powder. The resulting powder was combined with a silicon powder standard sample and the crystal structure was identified using a powder X-ray diffraction apparatus (RAD™, product of Rigaku Corp.). This confirmed that the single crystal of Example 1 belonged to the space group C2/c.

Next, an approximately cuboid sample (inorganic scintillator single crystal) with a size of 4 mm×6 mm×20 mm was cut out from the obtained single crystal ingot (cutting step). An inner perimeter cutter was used for the cutting, and the blade of the inner perimeter cutter was a blade electrodeposited with #325-400 natural diamond.

[Measurement of Fluorescence Spectrum]

Figure 2:
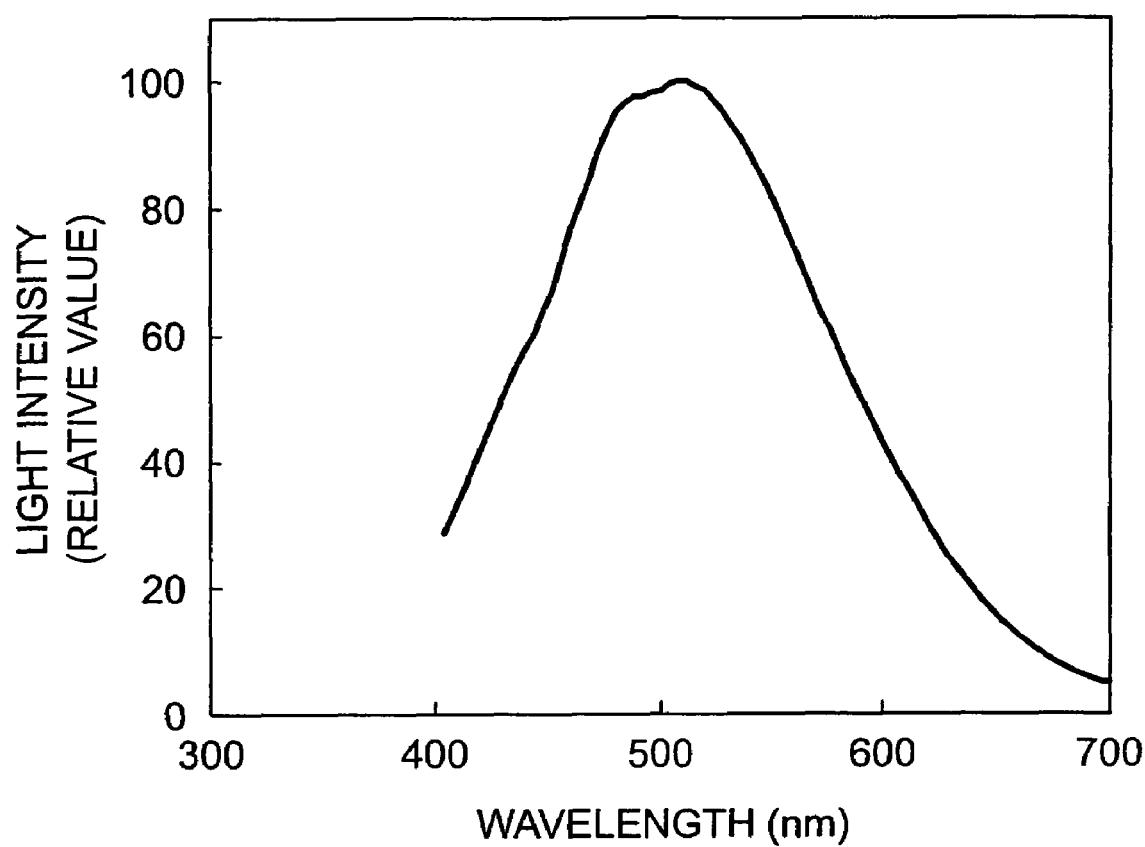
FIG. 2 is a graph showing the fluorescent spectrum of the inorganic scintillator produced in Example 1.

The fluorescence spectrum of the (approximately cuboid) sample was measured using a fluorescence spectrophotometer (Model F-4500, product of Hitachi, Ltd.). The excitation wavelength of maximum light intensity was 392 nm. There was measured the fluorescence spectrum emitted with excitation at the excitation wavelength of 392 nm which produced the maximum light intensity. The results are shown in FIG. 2. The light intensity peak wavelength was 510 nm.

[Measurement of Light Output]

Polytetrafluoroethylene (PTFE) tape was covered as a reflective material onto five of the six sides of the (approximately cuboid) sample, excluding one of the sides with a size of 4 mm×6 mm (hereinafter referred to as "radiation incident side"). The sample was then placed with the radiation incident side lacking the PTFE tape covering positioned facing the photomultiplier side (photoelectric conversion side) of a photomultiplier tube (H1949™) by Hamamatsu Photonics and fixed using optical grease, to obtain an inorganic scintillator.

The sample was irradiated with 611 KeV radiation using $^{137}$Cs, and the time-dependent change in fluorescent pulse output was measured using a digital oscilloscope (TDS3052™) by Techtronics. The light output was determined from the resulting time-dependent change curve for the fluorescent pulse output. The light output was determined as a relative value with respect to 100 as the light output obtained by measurement in the same manner for an inorganic scintillator composed of NaI. The results are shown in Table 1.

Comparative Example 1

In an Ir crucible having the same shape shown in FIG. 1 with a diameter of 150 mm, a height of 150 mm and a thickness of 3 mm there were loaded 11952 g of gadolinium oxide ($Gd_2O_3$, 99.99 wt % purity), 1990.97 g of silicon dioxide ($SiO_2$, 99.99 wt % purity) and 57.03 g of cerium oxide ($CeO_2$, 99.99 wt % purity) as the starting materials, and 14000.00 g of the mixture was obtained. The crucible was then placed at a prescribed position of a high-frequency induction heating furnace and the mixture was heated to melting at 1950° C. or higher to obtain a melt (chemical composition of melt: $Ce_{0.01}Gd_{1.99}SiO_5$).

Next, the end of the lifting rod to which the seed crystal was anchored was placed in the melt for crystal growth. The seed crystal used was a cut-out single crystal composed of a metal oxide containing Gd, Ce and Si, obtained by an ordinary crystal growth method. After growth of the single crystal and before its cutting (trimming), the crystal structure was identified using a powder X-ray diffraction apparatus (RAD™, product of Rigaku Corp.). As a result, the single crystal of Comparative Example 1 was confirmed to belong to monoclinic crystals of the space group $P2_1/c$.

Figure 3:
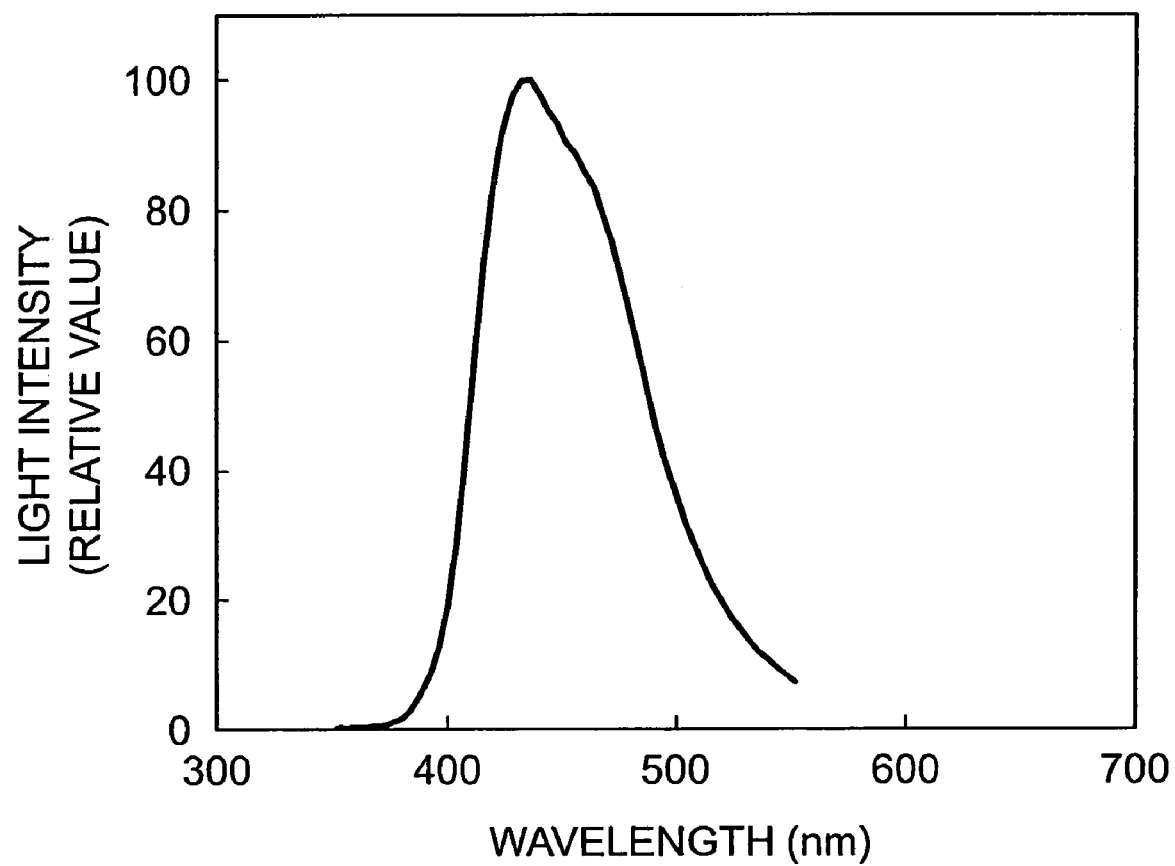
FIG. 3 is a graph showing the fluorescent spectrum of the inorganic scintillator produced in Comparative Example 1.

The cuboid sample (inorganic scintillator single crystal) was then cut out in the same manner as Example 1. The obtained sample was used for measurement of the fluorescence spectrum in the same manner as Example 1. The results are shown in FIG. 3. The results of light output measurement are shown in Table 1.

Comparative Example 2

In an Ir crucible having the same shape shown in FIG. 1 with a diameter of 150 mm, a height of 150 mm and a thickness of 3 mm there were loaded prescribed amounts of gadolinium oxide ($Gd_2O_3$, 99.99 wt % purity), lutetium oxide ($Lu_2O_3$, 99.99 wt % purity), silicon dioxide ($SiO_2$, 99.99 wt % purity) and cerium oxide ($CeO_2$, 99.99 wt % purity) as the starting materials, and a mixture thereof was obtained. The crucible was then placed at a prescribed position of a high-frequency induction heating furnace and the mixture was heated to melting at 1950° C. or higher to obtain a melt (chemical composition of melt: $Ce_{0.002}Lu_{0.4}Gd_{1.598}SiO_5$).

Next, the end of the lifting rod to which the seed crystal was anchored was placed in the melt for crystal growth. The seed crystal used was a cut-out single crystal composed of a metal oxide containing Lu, Gd, Ce and Si, obtained by an ordinary crystal growth method. After growth of the single crystal and before its cutting (trimming), the crystal structure was identified using a powder X-ray diffraction apparatus (RAD™, product of Rigaku Corp.). As a result, it was confirmed that the single crystal of Comparative Example 2 belonged to the space group C2/c.

The cuboid sample (inorganic scintillator single crystal) was then cut out in the same manner as Example 1. The obtained sample was used for measurement of the fluorescence spectrum in the same manner as Example 1. The light intensity peak wavelength and light output are shown in Table 2.

Comparative Example 3

In an Ir crucible having the same shape shown in FIG. 1 with a diameter of 150 mm, a height of 150 mm and a thickness of 3 mm there were loaded prescribed amounts of gadolinium oxide ($Gd_2O_3$, 99.99 wt % purity), silicon dioxide ($SiO_2$, 99.99 wt % purity) and cerium oxide ($CeO_2$, 99.99 wt % purity) as the starting materials, and a mixture was obtained. The crucible was then placed at a prescribed position of a high-frequency induction heating furnace and the mixture was heated to melting at 1950° C. or higher to obtain a melt (chemical composition of melt: $Ce_{0.02}Gd_{1.98}SiO_5$).

Next, the end of the lifting rod to which the seed crystal was anchored was placed in the melt for crystal growth. The seed crystal used was a cut-out single crystal composed of a metal oxide containing Gd, Ce and Si, obtained by an ordinary crystal growth method. After growth of the single crystal and before its cutting (trimming), the crystal structure was identified using a powder X-ray diffraction apparatus (RAD™, product of Rigaku Corp.). As a result, it was confirmed that the single crystal of Comparative Example 3 belonged to the space group $P2_1/c$.

The cuboid sample (inorganic scintillator single crystal) was then cut out in the same manner as Example 1. The obtained sample was used for measurement of the fluorescence spectrum in the same manner as Example 1. The light intensity peak wavelength and light output are shown in Table 2.

Comparative Example 4

In an Ir crucible having the same shape shown in FIG. 1 with a diameter of 150 mm, a height of 150 mm and a thickness of 3 nm there were loaded lutetium oxide ($Lu_2O_3$, 99.99 wt % purity), silicon dioxide ($SiO_2$, 99.99 wt % purity) and cerium oxide ($CeO_2$, 99.99 wt % purity) as the starting materials, and a mixture was obtained. The crucible was then placed at a prescribed position of a high-frequency induction heating furnace and the mixture was heated to melting at 1950° C. or higher to obtain a melt (chemical composition of melt: $Ce_{0.002}Lu_{1.998}SiO_5$).

Next, the end of the lifting rod to which the seed crystal was anchored was placed in the melt for crystal growth. The seed crystal used was a cut-out single crystal composed of a metal oxide containing Lu, Ce and Si, obtained by an ordinary crystal growth method. After growth of the single crystal and before its cutting (trimming), the crystal structure was identified using a powder X-ray diffraction apparatus (RAD™, product of Rigaku Corp.). As a result, it was confirmed that the single crystal of Comparative Example 4 belonged to the space group $P2_1/c$.

The cuboid sample (inorganic scintillator single crystal) was then cut out in the same manner as Example 1. The obtained sample was used for measurement of the fluorescence spectrum in the same manner as Example 1. The light intensity peak wavelength and light output are shown in Table 2.

TABLE 1

|  | Example 1 | Comp. Ex. 1 |
|---|---|---|
| Chemical composition | $Ce_{0.02}Lu_{0.4}Gd_{1.58}SiO_5$ | $Ce_{0.01}Gd_{1.99}SiO_5$ |
| Light intensity peak wavelength (nm) | 510 | 430 |
| Light output | 40 | 20 |

TABLE 2

|  | Comp. Ex. 2 | Comp. Ex. 3 | Comp. Ex. 4 |
|---|---|---|---|
| Chemical composition | $Ce_{0.002}Lu_{0.4}Gd_{1.598}SiO_5$ | $Ce_{0.02}Gd_{1.98}SiO_5$ | $Ce_{0.002}Lu_{1.998}SiO_5$ |
| Light intensity peak wavelength (nm) | 420 | 430 | 420 |
| Light output | 25 | 18 | 80 |

What is claimed is:

1. An inorganic scintillator having the chemical composition represented by formula (1) and inequalities (2) to (5) and emitting fluorescence upon incidence of radiation, wherein the maximum peak wavelength in the light intensity spectrum is a peak in the range between 450 nm and 600 nm;

$$Ce_xLn_ySi_zO_u \quad (1)$$

$$0.001 \leq x \leq 0.1 \quad (2)$$

$$1.9 \leq y \leq 2.1 \quad (3)$$

$$0.9 \leq z \leq 1.1 \quad (4)$$

$$4.9 \leq u \leq 5.1 \quad (5)$$

where Ln in formula (1) represents at least two elements selected from among Y, Gd and Lu.

2. An inorganic scintillator according to claim 1, wherein the peak wavelength of said light intensity spectrum is between 500 nm and 550 nm.

3. An inorganic scintillator according to claim 1, wherein said fluorescence is principally due to oxygen-hexacoordinated cerium atoms.

4. An inorganic scintillator according to claim 1, wherein the inorganic scintillator is a crystal belonging to monoclinic crystals of the space group C2/c.

5. An inorganic scintillator according to claim 1, wherein the inorganic scintillator is a single crystal.

6. An inorganic scintillator according to claim 1, wherein the inorganic scintillator satisfies the condition represented by inequality (6)

$$0.02 \leq x \leq 0.1 \quad (6).$$

7. An inorganic scintillator according to claim 1, wherein Ln in formula (1) is Gd and Lu.

8. An inorganic scintillator according to claim 7, wherein the molar fraction value for Gd is equal to or greater than the molar fraction value for Lu.

9. An inorganic scintillator according to claim 1, wherein Ln in formula (1) is Y and Lu.

10. An inorganic scintillator according to claim 9, wherein the molar fraction value for Y is equal to or greater than the molar fraction value for Lu.

11. An inorganic scintillator according to claim 1, wherein Ln in inequality (1) is Y, Gd and Lu.

12. An inorganic scintillator according to claim 11, wherein the total molar fraction value for Y and Gd is equal to or greater than the molar fraction value for Lu.

13. A radiation detector comprising a combination of an inorganic scintillator according to any one of the claims 1 to 12, and a photodiode.

14. A PET apparatus provided with a radiation detector according to claim 13.

* * * * *